United States Patent
Brown et al.

(10) Patent No.: US 10,742,695 B1
(45) Date of Patent: Aug. 11, 2020

(54) METHODS AND SYSTEMS OF RECORDING INFORMATION RELATED TO AN ELECTRONIC CONFERENCE SYSTEM

(71) Applicant: Salesloft, Inc., Atlanta, GA (US)

(72) Inventors: Austin Michael Brown, Apex, NC (US); Matthew Irish Finneran, Apex, NC (US)

(73) Assignee: Salesloft, Inc., Atlanta, GA (US)

( * ) Notice: Subject to any disclaimer, the term of this patent is extended or adjusted under 35 U.S.C. 154(b) by 0 days.

(21) Appl. No.: 16/524,653

(22) Filed: Jul. 29, 2019

Related U.S. Application Data

(60) Provisional application No. 62/713,281, filed on Aug. 1, 2018.

(51) Int. Cl.
| | |
|---|---|
| H04L 29/06 | (2006.01) |
| H04L 29/08 | (2006.01) |
| H04L 12/58 | (2006.01) |
| G06F 17/27 | (2006.01) |
| G06F 40/205 | (2020.01) |

(52) U.S. Cl.
CPC ............ H04L 65/403 (2013.01); H04L 51/02 (2013.01); H04L 67/02 (2013.01); G06F 40/205 (2020.01)

(58) Field of Classification Search
CPC ....... H04L 65/403; H04L 67/02; H04L 51/02; G06F 17/2705
See application file for complete search history.

(56) References Cited

U.S. PATENT DOCUMENTS

| | | |
|---|---|---|
| 7,760,865 B2 | 7/2010 | Awan et al. |
| 8,064,342 B2 | 11/2011 | Badger |
| 8,631,069 B2 | 1/2014 | Maes |
| 9,256,695 B1 | 2/2016 | Willis et al. |
| 9,392,122 B2 | 7/2016 | Sall |
| 9,699,409 B1 | 7/2017 | Reshef et al. |
| 9,992,448 B2 | 6/2018 | Reshef et al. |
| 10,218,839 B2 | 2/2019 | Gupta et al. |
| 10,325,284 B1 | 6/2019 | Aggarwal et al. |
| 2007/0206759 A1 | 9/2007 | Boyanovsky |
| 2009/0274284 A1 | 11/2009 | Arsenault et al. |
| 2010/0135477 A1 | 6/2010 | Chen |
| 2010/0205543 A1 | 8/2010 | Von Werther et al. |

(Continued)

OTHER PUBLICATIONS

WebEx Meeting Center with Collaboration Meeting Rooms (CMR Cloud) User Guide, https://www.cisco.com/c/en/us/td/docs/collaboration/meeting_center/wbs2913/CMR_Cloud_User_Guide.pdf, total 24 pages, Publication Date: Aug. 1, 2014.

(Continued)

Primary Examiner — Alina A Boutah
(74) Attorney, Agent, or Firm — DLA Piper LLP (US)

(57) ABSTRACT

Methods and systems for recording information related to an electronic conference system meeting. A virtual participant bot can be enabled to join an electronic conference system meeting in order to record electronic information streams related to the meeting. A comment tag related to the electronic conference system meeting can be defined. A pre-defined comment tag category for a pre-defined comment tag to assign to a recorded portion of the meeting can be designated, wherein a user of the electronic conference system meeting configures the pre-defined meaning.

14 Claims, 6 Drawing Sheets

(56) References Cited

U.S. PATENT DOCUMENTS

| | | | |
|---|---|---|---|
| 2010/0223389 A1* | 9/2010 | Ananthanarayanan | G06F 21/57 709/229 |
| 2011/0228921 A1* | 9/2011 | Singh | H04L 12/1831 379/202.01 |
| 2011/0271210 A1 | 11/2011 | Jones et al. | |
| 2012/0051267 A1 | 3/2012 | Ma et al. | |
| 2013/0076853 A1* | 3/2013 | Diao | H04N 7/15 348/14.08 |
| 2013/0191719 A1* | 7/2013 | Underhill | G06Q 10/10 715/231 |
| 2014/0006611 A1 | 1/2014 | Perez | |
| 2015/0036810 A1 | 2/2015 | Rashid et al. | |
| 2016/0253314 A1* | 9/2016 | Pottier | G06F 17/2765 704/235 |
| 2016/0381215 A1 | 12/2016 | Goyal et al. | |
| 2017/0257598 A1 | 9/2017 | Reshef et al. | |
| 2017/0345325 A1 | 11/2017 | Metts | |
| 2018/0082208 A1 | 3/2018 | Comier et al. | |
| 2018/0121828 A1* | 5/2018 | Keysers | G06N 20/00 |
| 2018/0176661 A1* | 6/2018 | Varndell | G11B 27/031 |
| 2018/0191901 A1 | 7/2018 | Aleksin et al. | |
| 2018/0227339 A1* | 8/2018 | Rodriguez | H04L 65/403 |
| 2018/0239822 A1 | 8/2018 | Reshef et al. | |
| 2018/0249122 A1 | 8/2018 | Reshef et al. | |
| 2018/0268318 A1 | 9/2018 | Matam et al. | |
| 2018/0330736 A1* | 11/2018 | Faulkner | G10L 17/005 |
| 2019/0068390 A1* | 2/2019 | Gross | H04L 12/1827 |
| 2019/0068526 A1* | 2/2019 | Xie | H04L 67/42 |
| 2019/0102846 A1 | 4/2019 | Loschiavo | |
| 2019/0182183 A1* | 6/2019 | Hubauer | H04L 51/02 |
| 2019/0205772 A1* | 7/2019 | Kohlmeier | G06F 17/241 |
| 2019/0318743 A1 | 10/2019 | Reshef et al. | |

OTHER PUBLICATIONS

Pexip Mobile App for Android Quick Guide, https://docs.pexip.com/files/v8/Pexip_Mobile_App_Android_Quickguide v8.a.pdf, Total 4 pages, Publication Date: Feb. 2015.

Lync conference invitations in SIP terms, http://blog.greenl.ee/2011/12/15/lync-conference-invitations/, Total 7 pages, Publication Date: Dec. 15, 2011.

RFC4579—Session Initiation Protocol (SIP) Call Control—Conferencing for User Agents, https://datatracker.ietf.org/doc/rfc4579/, pp. 3, Publication Date: Aug. 2006.

U.S. Appl. No. 16/518,367 on Nov. 15, 2019.

U.S. Appl. No. 16/518,367 on Apr. 21, 2020 from Feb. 25, 2020 to Apr. 21, 2020.

U.S. Appl. No. 16/558,692 on Apr. 21, 2020 from Feb. 25, 2020 to Apr. 21, 2020.

U.S. Appl. No. 15/852,259 on Apr. 21, 2020 from Feb. 25, 2020 to Apr. 21, 2020.

U.S. Appl. No. 16/518,367 on Feb. 25, 2020 from Nov. 15, 2019 to Feb. 25, 2020.

U.S. Appl. No. 16/558,692 on Feb. 25, 2020.

U.S. Appl. No. 15/852,259 on Feb. 25, 2020.

U.S. Appl. No. 16/518,367 on Jun. 3, 2020 from Apr. 21, 2020 to Jun. 3, 2020.

U.S. Appl. No. 16/558,692 on Jun. 3, 2020 from Apr. 21, 2020 to Jun. 3, 2020.

U.S. Appl. No. 16/855,610 on Jun. 3, 2020.

U.S. Appl. No. 16/558,692, filed Sep. 3, 2019, Pending.

U.S. Appl. No. 15/852,259, filed Dec. 22, 2017, Pending.

U.S. Appl. No. 16/518,367, filed Jul. 22, 2019, Pending.

U.S. Appl. No. 16/855,610, filed Apr. 22, 2020, Pending.

* cited by examiner

METHODS AND SYSTEMS OF RECORDING INFORMATION RELATED TO AN ELECTRONIC CONFERENCE SYSTEM

CROSS-REFERENCE TO RELATED APPLICATIONS

The present application claims priority to U.S. provisional Ser. No. 62/713,281, filed on Aug. 1, 2018, titled "SYSTEMS AND METHODS FOR ELECTRONIC NOTETAKING." This provisional application is herein incorporated by reference in its entirety for all purposes.

BRIEF DESCRIPTION OF THE FIGURES

FIG. 1 illustrates a screen shot showing a main screen, according to an embodiment.

FIG. 2 illustrates a meeting intelligence screen shot, according to an embodiment.

DETAILED DESCRIPTION OF EMBODIMENTS OF THE INVENTION

Figure 1:
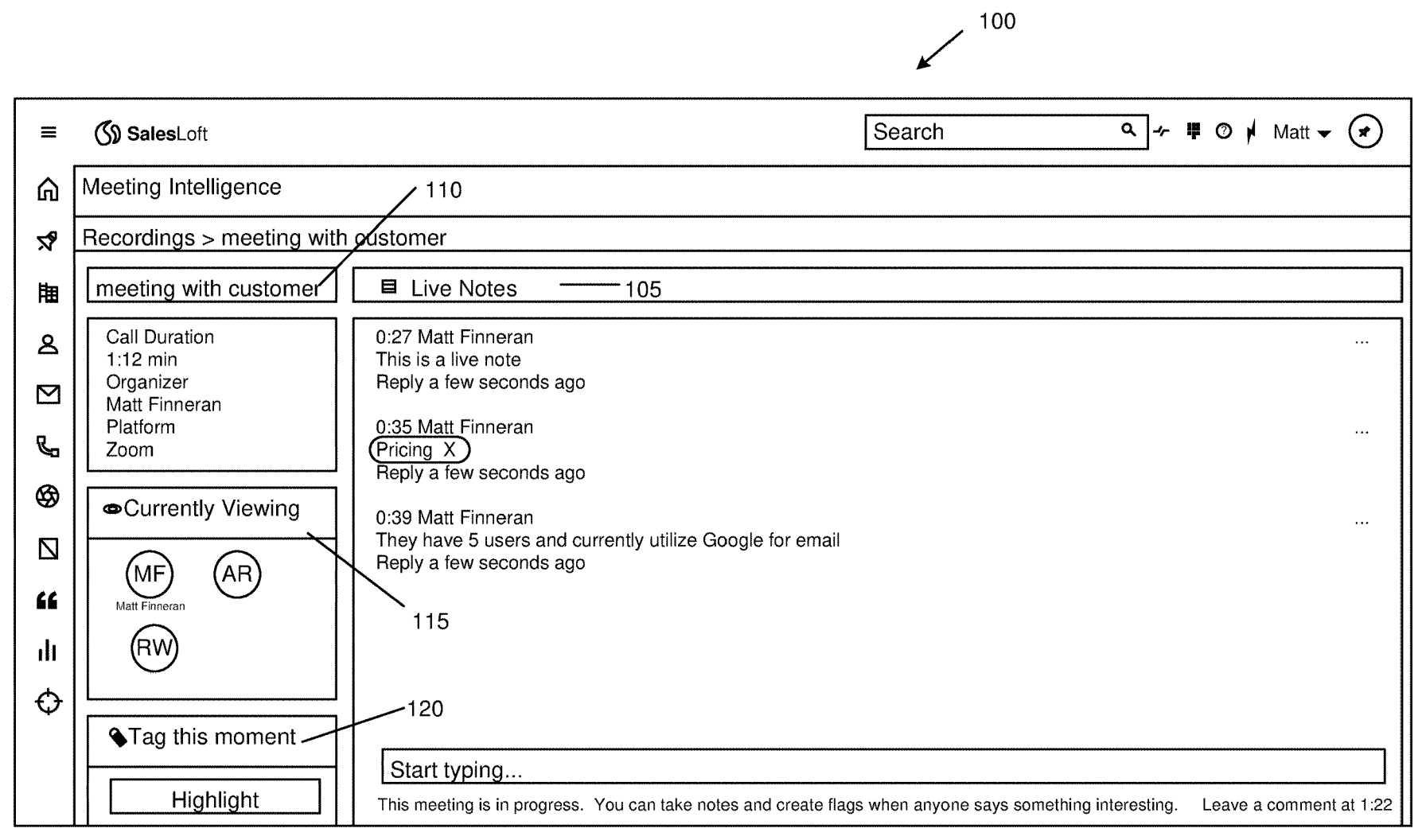
Figure 3:
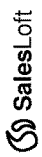
FIG. 3 illustrates an add bot screen where a meeting ID is entered, according to an embodiment.

FIG. 1 illustrates a screen shot showing a main screen 100, according to an embodiment. A live notes section 105 can be displayed where a user (e.g., Matt) can enter in notes while in an electronic conference system meeting (e.g., a phone meeting or an in-person meeting) is taking place. The time into the meeting is displayed along with the note created by the user at that time. A meeting summary section 110 can display information about the meeting, such as call duration (e.g., 1:12), the organizer (e.g., Matt), and the platform (e.g., ZOOM). In some embodiments, any or all of the following platforms can be supported: WEBEX, ZOOM, GOTOMEETING, UBERCONFERENCE, JOIN.ME. Those of ordinary skill will see that any other current conferencing platform or any future conferencing platform can also be used.

A currently viewing section 115 can comprise the participants (e.g., Matt, Abby, Ryland). A tag section 120 can comprise any or all of the following tags which can enable a participant to tag the meeting: Budget, Negotiation, Pricing, Intro, Next Steps, Objection, Needs, Business, Outcome, Timing, and Authority. A tag (also called "comment tag") can be pinned to an exact moment of its creation (or a moment before its creation) within the context of the recording of the meeting and designated by the user (e.g., related to Budget, related to Pricing) so that the user can easily go back and access or replay any tagged portions of the meeting. Those of ordinary skill in the art will see that any other type of meeting tag can be created.

To create a tag, a comment tag category that can later be associated to a specific comment tag can be created, as show in the following example code:

```
// DB library syntax inspired by knex.js database connection library
const sql = '
```

```
insert into main.comment_tags (organization_id, tag_name)
values(:organizationId, :tagName)
returning id
';
let bindParams = {
  organizationId,
  tagName
};
const conn = db.getConnection( );
const newCommentTags = await conn.raw(sql, bindParams);
const {id: newTagId} = newCommentTags.rows[0];
```

A comment tag with a category id associated to it can then be inserted, as illustrated in the following example code (e.g., where the timestamp is for 10 seconds ago):

```
// DB library syntax inspired by knex.js database connection library
// next, using the newTagId created in the snippet above
conn('comment').insert({text: /* comment text */', created_at_in_milliseconds: Date.now( )-(10*1000), tag_id: newTagId})
```

As mentioned above, when a comment tag is created, the date can be moved to a certain time period before the comment tag is created so that the beginning of the important information is captured. This time period can be 1 second-25 seconds, or even longer. The above example code uses an example of saving a comment with a date of 10 seconds ago. In some embodiment, a user can designate a certain time period for each of the comment tags (e.g., all tags can go back 3 seconds, or the Pricing tag can go back 2 seconds, but a Budget tag can go back 10 seconds)

Figure 2:
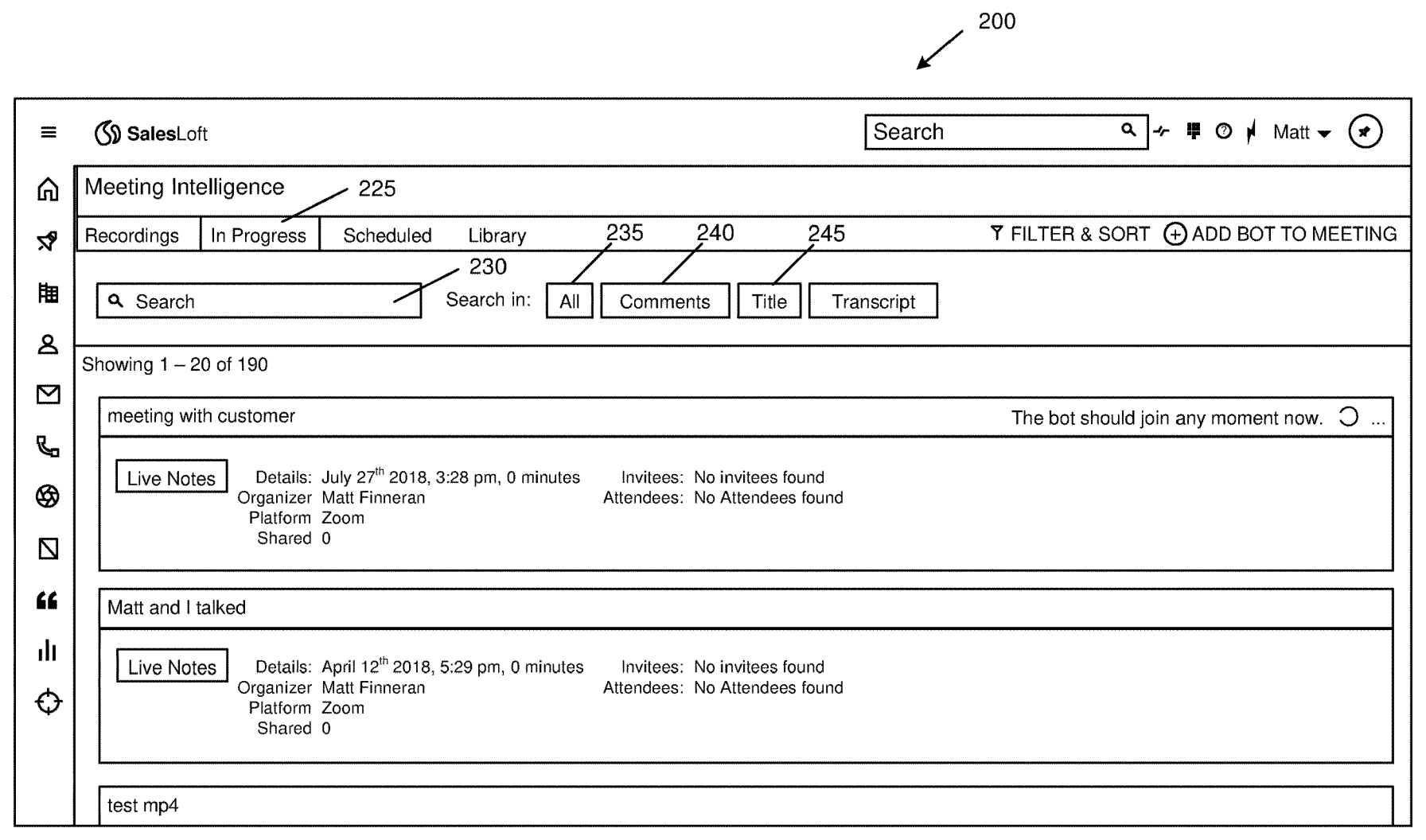

FIG. 2 illustrates a meeting intelligence screen shot 200, according to an embodiment. Several types of meeting information can be accessed. The in-progress screen 225 can show notes from in-progress meetings. A search box can be provided in 230, with tabs where the user can filter the content that is searched. The search tabs can comprise: all 235, comments 240, and title 245. In each in-progress meeting summary that is shown in 225, the following information can be shown: details (date, time, duration), organizer, platform, shared, invitees, attendees, other participants, comments from participants, or comment tags, or any combination thereof.

Figure 5:
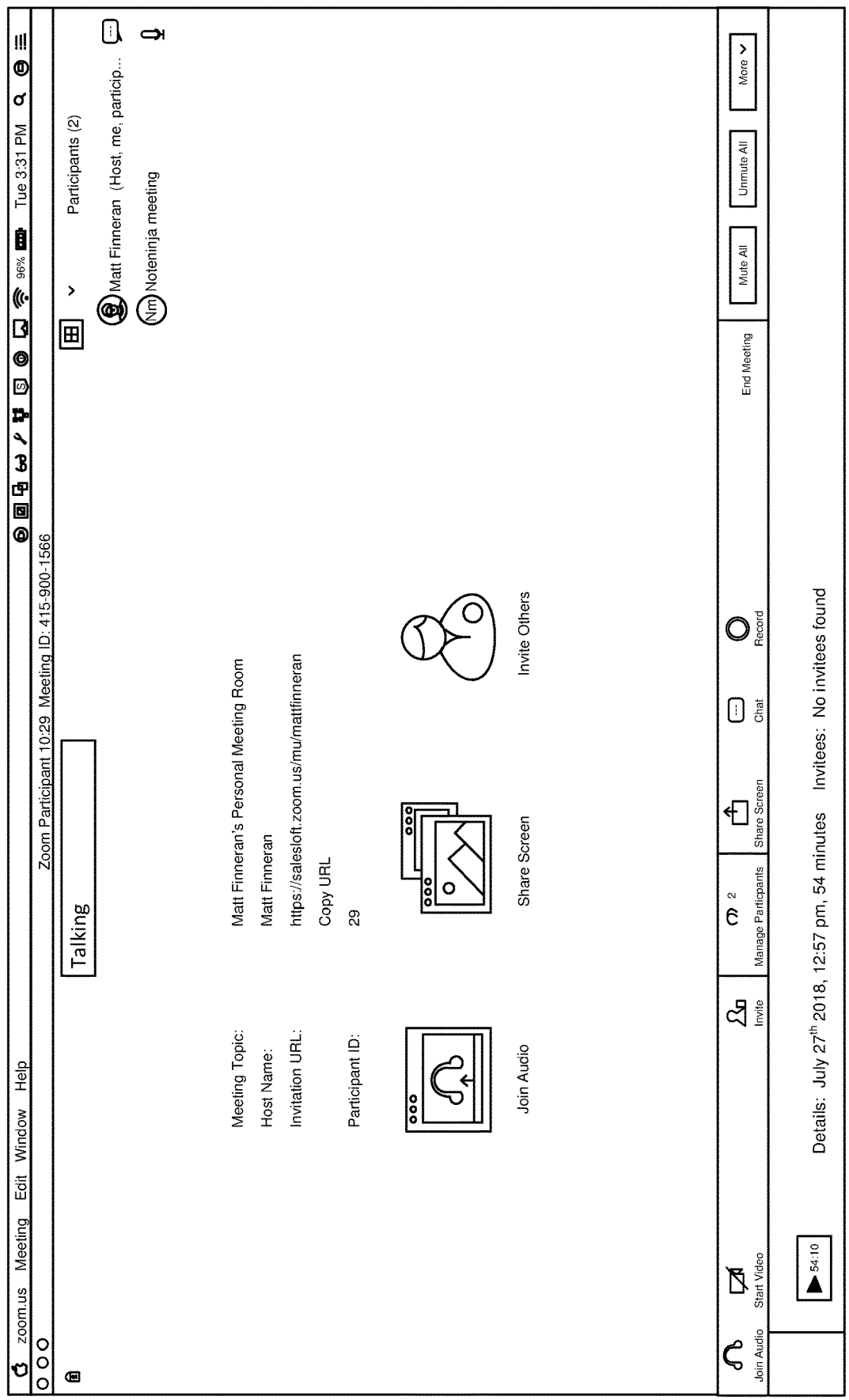
FIG. 5 illustrates how to indicate that a bot is "attending" and recording the meeting, according to an embodiment.

FIG. 3 illustrates a screen shot showing an add bot screen 300, according to an embodiment. When a bot is added, this means that a virtual participant (e.g., that is recording the call) is present. For example, FIG. 5 illustrates how to indicate that a bot is "attending" and recording the meeting. In the top right corner of FIG. 5, an icon appears showing NOTENINJA to be a participant. This indicates that the meeting is being recorded by the bot.

A meeting platform section 305 can allow a user to enter in a platform (e.g., ZOOM) for the bot, A meeting title section 310 can allow a user to enter in a title for the meeting (e.g., "meeting with customer"). A meeting ID or URL section 315 can allow the user to enter in the meeting ID or URL. The pseudo-code below illustrates an example of how a bot can join a meeting by URL. The code below illustrates how the URL the user provides is parsed in order to find details about the meeting required to join the meeting (e.g., the meeting ID) from the URL (in this example a UBERCONFERENCE platform is used, although any platform can be used):

```
const userInput='https://uberconference.com/personal_meeting_example_id';
const regex=/uberconference\.com\/([a-z0-9-_.]+)/i;
```

```
const matches=userInput.match(regex);
const meetingId=matches[1];
```
Any URL can be parsed to find the meeting ID. For example, the following types of URLs can be parsed:

https://global.gotomeeting.com/join/456684725
https://app.gotomeeting.com/123456789
https://www.gotomeeting.com/join/138906133
https://www.gotomeet.me/RickSanchezz685
https://zoom.us/j/561755827
https://examplecompanydomain.zoom.us/my/examplepersonatcompany
https://www.uberconference.com/mattnoteninja123_-_-
https://join.me/996-967-779
https://join.me/austin609
https://austinboondockcities.my.webex.com/join/austin The code below illustrates how the meeting ID can be used to join a meeting in a web browser (using, for example, node.js_webdriver bindings for a browser):

```
const driver=new webdriver.Builder( ).build( );
const url='https://www.uberconference.com/${meetingId}';
console.log('LOG: doing ${meetingPlatform} url: ${url}');
driver.get('https://www.uberconference.com/${meetingId}');
```

Figure 4:
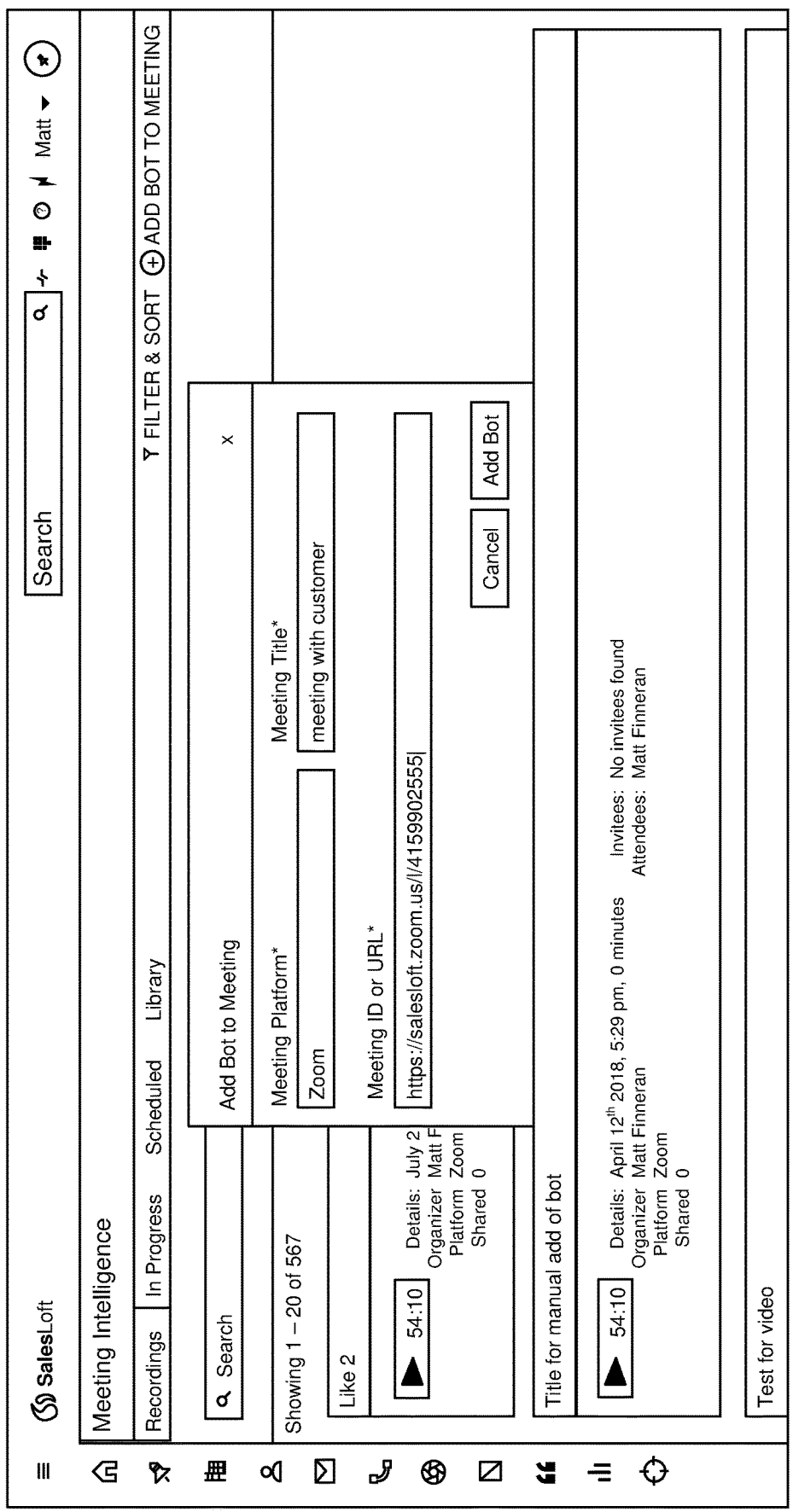
FIG. 4 illustrates an add bot screen where a URL is entered, according to an embodiment.

FIG. 3 illustrates an add bot screen where a meeting ID is entered, and FIG. 4 illustrates an add bot screen where a URL is entered.

Figure 6:
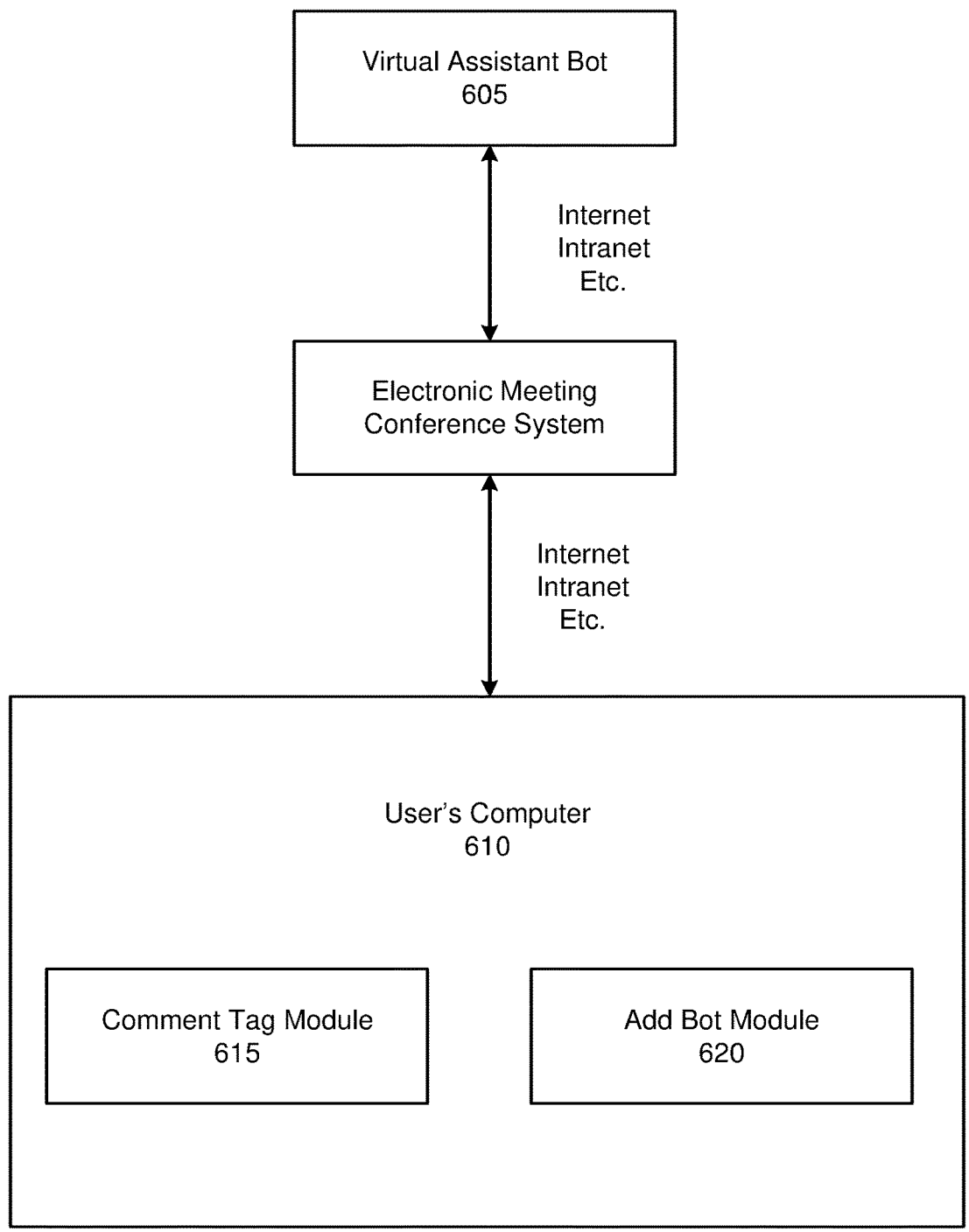
FIG. 6 illustrates a system diagram, according to an embodiment.

FIG. 6 illustrates a system diagram, according to an embodiment. A virtual assistant bot 605 can record any meeting that uses an electronic conference system meeting. A user's computer 610 (e.g., a SALESLOFT user using a SALESLOFT web application) can have installed or otherwise access a comment tag module 615 and an add recording bot module 620. Those of ordinary skill in the art will recognize that a user can be: a sales manager, an administrator, or a participant in the electronic conference system meeting, or any other person or entity that interacts with the system. The comment tag module can enable adding and using comment tags, as descried above. The add recording bot module can enable adding a virtual participant bot to record the meeting. The electronic conferencing system 620 can be a connector that ties the user to the meeting and also ties the virtual assistant bot to the meeting.

While the disclosure has been described with reference to numerous specific details, one of ordinary skill in the art will recognize that the disclosure can be embodied in other specific forms without departing from the spirit of the disclosure. In addition, a number of the figures illustrate processes. The specific operations of these processes may not be performed in the exact order shown and described. The specific operations may not be performed in one continuous series of operations, and different specific operations may be performed in different embodiments. Thus, one of ordinary skill in the art would understand that the invention is not to be limited by the foregoing illustrative details, but rather is to be defined by the appended claims.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures or description which highlight the functionality and advantages are presented for example purposes only. The disclosed methodology and system are each sufficiently flexible and configurable such that they may be utilized in ways other than that shown. For example, any steps or limitations in the specification, figures and claims may be done in another order than the order portrayed.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method of recording information related to an electronic conference system meeting, comprising:
   enabling a virtual participant bot to join an electronic conference system meeting in order to record electronic information streams related to the meeting;
   defining a comment tag related to the electronic conference system meeting; and
   designating a pre-defined comment tag category for a pre-defined comment tag to assign to a recorded portion of the meeting, wherein a user of the electronic conference system meeting configures the pre-defined meaning.

2. The method of claim 1, wherein the electronic conference system meeting comprises a virtual meeting using a computer, or an in-person meeting recorded with a computer, or both.

3. The method of claim 1, wherein the virtual participant bot utilizes a URL provided by the user to determine the meeting ID to enable the bot to join the electronic meeting.

4. The method of claim 1, wherein the bot utilizes a meeting ID provided by the user to enable the bot to join the electronic conference system meeting.

5. The method of claim 1, wherein the comment tag can be referenced at a later date by accessing the comment tag to replay a designated portion of the electronic conference system meeting.

6. The method of claim 1, wherein the comment tag is pinned to a moment of creation within a recording of the electronic conference system meeting a pre-designated amount of time before the comment tag is created.

7. The method of claim 1, wherein the comment tag is pinned to a moment of creation within a recording of the electronic conference system meeting 1 second to 25 seconds before the comment is created.

8. A system of recording information related to an electronic conference system meeting, comprising:

a processor configured for:

enabling a virtual participant bot to join an electronic conference system meeting in order to record electronic information streams related to the meeting;

defining a comment tag related to the electronic conference system meeting; and designating a pre-defined comment tag category for a pre-defined comment tag to assign to a recorded portion of the meeting, wherein a user of the electronic conference system meeting configures the pre-defined meaning.

9. The system of claim 8, wherein the electronic conference system meeting comprises a virtual meeting using a computer, or an in-person meeting recorded with a computer, or both.

10. The system of claim 8, wherein the virtual participant bot utilizes a URL provided by the user to determine the meeting ID to enable the bot to join the electronic meeting.

11. The system of claim 8, wherein the bot utilizes a meeting ID provided by the user to enable the bot to join the electronic conference system meeting.

12. The system of claim 8, wherein the comment tag can be referenced at a later date by accessing the comment tag to replay a designated portion of the electronic conference system meeting.

13. The system of claim 8, wherein the comment tag is pinned to a moment of creation within a recording of the electronic conference system meeting a pre-designated amount of time before the comment tag is created.

14. The system of claim 8, wherein the comment tag is pinned to a moment of creation within a recording of the electronic conference system meeting 1 second to 25 seconds before the comment is created.

* * * * *